No. 649,008. Patented May 3, 1900.
C. P. STEINMETZ.
FREQUENCY INDICATOR.
(Application filed Dec. 9, 1899.)
(No Model.)
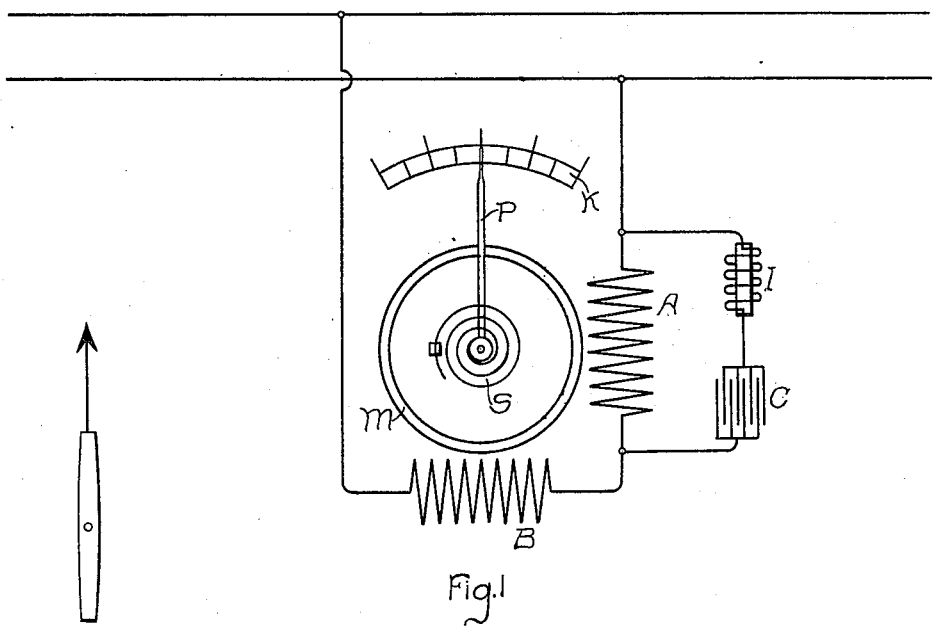
Fig. 1
Fig. 3
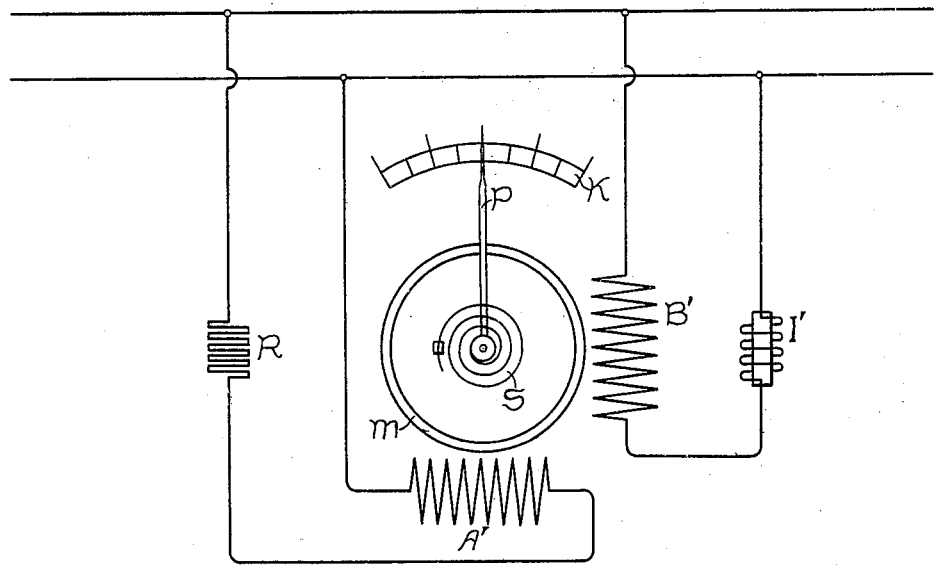
Fig. 2
Witnesses.
Fred G. Waring
Benjamin B. Hull.
Inventor.
Charles P. Steinmetz.
by Albert G. Davis
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

FREQUENCY-INDICATOR.

SPECIFICATION forming part of Letters Patent No. 649,008, dated May 8, 1900.

Original application filed January 9, 1899, Serial No. 701,597. Divided and this application filed December 9, 1899. Serial No. 739,741. (No model.)

*To all whom it may concern:*

Be it known that I, CHARLES P. STEINMETZ, a citizen of the United States, residing at Schenectady, in the county of Schenectady, State of New York, have invented certain new and useful Improvements in Frequency-Indicators, (Case No. 1,500,) of which the following is a specification.

This application is a division of my application, Serial No. 701,597, filed January 9, 1899, (Case No. 642.)

My present invention relates to apparatus for measuring or indicating the frequency of alternating or periodically-varying electric currents.

The principle of operation of my invention depends upon the fact that the relations existing between the electromotive forces consumed by resistance, inductance, and capacity vary with variation in frequency of the electromotive force impressed. Changes in frequency thus cause changes in the phase relations of the system, and I take advantage of this fact by causing the changes in phase relations to take place between the currents flowing in a plurality of angularly-displaced coils within the influence of which is located a relatively-movable member responsive to the currents in such coils. As the frequency changes the relatively-movable member shifts in position, and thus serves by its changing position to indicate the frequency.

The two forms of apparatus which I have hereinafter described as embodying my invention consist of indicating mechanisms each containing relatively fixed and movable members, the members being arranged with respect to each other so that one member is acted upon by the differential or resultant effect of a plurality of magnetomotive forces produced through the medium of the other member. This mode of action as applied to a frequency-indicator I consider to be broadly new.

My invention will be more clearly understood from the following description, taken in connection with the accompanying drawings, in which—

Figure 1 represents one embodiment of my invention; Fig. 2, a different form, and Fig. 3 a detail.

In Fig. 1 the relatively-movable member $m$ is arranged to be acted upon by currents traversing two angularly-displaced coils A B. These coils are arranged in series with each other, with their outer terminals connected across mains $a\ b$, as shown. Shunted about one of the coils A is a circuit containing inductance and capacity arranged in series. The inductance may be produced by a suitable inductance-coil I, while a condenser C may be used to supply the capacity. The relative values of resistance, inductance, and capacity are so chosen that their effects so far neutralize each other at some predetermined frequency as to render the circuit shunted about the coil A of the same time constant as the coil A itself. Under this condition currents in the coils A and B are in the same phase with each other, and no effect therefore is produced upon the short-circuited member $m$ within their influence. The pointer $p$, carried by the member $m$, then corresponds to a point on the scale K indicating the frequency of the current then traversing the circuit $a\ b$. In this position the restoring-spring S is in its neutral condition and not under tension. If now the frequency in the circuit $a\ b$ were to rise, the effects of the inductance I and capacity C would no longer bear the same relation to each other, thus causing a displacement of phase of the current in the coil A and a consequent difference in phase between the currents in the coils A B. The field acting upon the induced member $m$ is therefore no longer reciprocating, but becomes rotary, and thus acts to produce rotation of the induced member $m$ and consequent movement of the pointer $p$ in opposition to the force of the spring S. This movement is greater the greater the inequality between the effects of the inductance I and the capacity C, and consequently the greater the change of frequency of current in the circuit $a\ b$. If the frequency were to fall instead of rise, the opposite effect would take place and the pointer $p$ would move in the reverse direction. By suitable calibration the indications of the pointer may be made to correspond to the values of frequency in the circuit to which the indicator is attached. The induced member $m$ may consist of a disk or cylinder of conducting material, as shown, and may operate by reason of the torque due to eddy-currents induced therein by the currents circulating in the primary or inducing member, or in place of the disk of conducting material I may substitute a needle or similar elongated piece of magnetic material, as shown separately in Fig. 3. In the latter case no restoring-spring is used; but, on the contrary, the needle is mounted so as to turn freely. The field which acts on the needle is not of uniform intensity, but varies through a considerable range, and, as represented by polar coördinates, is elliptical in form rather than circular. The eccentricity of the ellipse, as well as the positions of its axes in space, is dependent upon the phase difference and relative magnitudes of the exciting-currents. So long as the frequency remains constant the axes of the elliptical field do not shift in space, but remain fixed regardless of change in impressed electromotive force.

I have found that when a needle of magnetic material is mounted, as described, within the influence of an elliptical field it will turn so as to place itself along the line of greatest magnetization of the field—in other words, along the major axis of the ellipse—and instead of rotating with the field will remain fixed in space and change in polarity as the field reverses in direction. This mode of action presupposes that the needle receives no initial rotation, and it depends on the fact that the inertia of the needle is such as to prevent it from instantly starting into synchronous rotation with the impressed field, the result of which is that the polarity of the needle is continually reversed, and it is thus alternately subjected to positive and negative torques, which balance each other when the needle is stationary. If the impressed field approaches closely a circular form, the needle will start into rotation of itself; but with the split-phase-inducing members such as shown in the drawings the production of such a field need not occur if proper precautions be taken in designing the apparatus. In any case suitable stops may be provided in order to limit the angle of rotation.

In Fig. 2 I have shown another form of my invention, similar to that of Fig. 1, but differing therefrom in important particulars. In this form of indicator two angularly-displaced and relatively-fixed coils A' and B' are arranged to be independently excited from the circuit $a\,b$, the frequency of which is to be measured. In series with one of the coils A' is the non-inductive resistance R of convenient value, while in series with the other coil B' is the reactive coil or inductance I', also of convenient valve. Currents passing through the coils A and B will produce a magnetic field, due to the resultant action of the magnetomotive forces acting in each coil. Within the influence of this resultant field is located a device of such a nature as to be acted upon dynamically thereby. This device may take the form of a short-circuited secondary—such, for instance, as a rotatably-mounted disk or cylinder, of conducting material—or as an alternative construction it may assume the form of a magnetic needle or similar elongated body of magnetic material, as described above and shown in Fig. 3. When the relatively-rotatable body consists of a disk or cylinder, it is so mounted as to be capable of movement only through a limited arc, while its movement throughout its range is resisted by some suitable reactive means—as, for example, a spiral spring or the like. If a needle of magnetic material is used, it is mounted so as to turn freely.

In Fig. 2 I have shown a disk or cylinder $m$, of conducting material, forming the relatively-movable part of the indicator, while the spiral spring S is used to produce the restoring moment for the relatively-movable member. A pointer or hand $p$ is attached to the movable member $m$ of the indicator and is arranged to move over a suitably-graduated scale K. In the operation of the indicator current passes through both of the actuating-coils A' and B' and the pointer $p$ takes a position such that the resultant action of the magnetomotive forces, due to current in coils A and B upon their relatively-movable disk or cylinder $m$ within their influence, is balanced by the torsional force of the spring S. If now the frequency of the current in the mains $a\,b$ were, for example, to increase the current through the coil A', containing in series therewith the resistance R, would remain unchanged so long as the electromotive force impressed did not vary. On the other hand, the current through the coil B', having in series therewith the inductance I', no longer remains the same, but would decrease in value and shift in phase with increase of frequency, thus changing the torque due to the resultant field acting upon the relatively-movable member $m$ of the indicator and so shifting the pointer $p$ to a new position on the scale. After suitable calibration the scale K may be suitably subdivided in any desired manner.

What I claim as new, and desire to secure by Letters Patent of the United States, is—

1. The combination of alternating-current mains, a plurality of angularly-displaced coils arranged to receive current through connections across said mains, a movable responsive device within the influence of currents in said coils, means for bringing said currents into phase with each other at a given frequency, and means for measuring the deflections of said responsive device.

2. A frequency-indicator comprising a plurality of coils, connections in shunt to an alternating-current circuit for supplying current to said coils, a device rotatable through a limited arc under the influence of currents in said coils, means for varying the phase relation of currents in said coils in response to variation of frequency of current in said circuit, and a scale and pointer for indicating the amount of rotation of said device.

3. A frequency-indicator comprising a plurality of coils traversed by currents of the same frequency, a device rotatable through a limited arc under the influence of current in said coils, means controlled by variation of frequency for altering the relation between currents in said coils, and means for indicating the amount of rotation of said device.

4. In a frequency-indicator, the combination of a plurality of coils traversed by currents of the same frequency, a device rotatable through a limited arc under the influence of currents in said coils, means responsive to frequency of current in said coils for bringing the currents therein into phase with each other at a given frequency, and a scale and pointer for indicating the amount of such rotation.

5. The combination of an alternating-current circuit, coils connected across said circuit whereby they are traversed by currents of the same frequency, a device rotatable through a limited arc under the influence of currents in said coils, means for exerting a restraining moment on said device, means for altering the relation of magnetomotive forces of said coils with alterations of frequency of the current supplied thereto, and means for indicating the angular deflection of said device.

6. A frequency-indicator comprising a plurality of angularly-displaced coils in series, means in shunt to one of said coils for producing a phase displacement of current therein, a movable responsive device within the influence of current in said coils, resilient means for restraining the rotation of said device, and means for measuring the angular displacement of said device.

7. A frequency-indicator comprising an inducing member having angularly-displaced coils receiving current through connections across alternating-current mains, a partially-rotatable induced member within the influence of currents in said coils, a spring normally restraining the rotation of said induced member, and a phase-shifting device shunted about one of said coils.

8. The combination of a plurality of angularly-displaced coils, a branch circuit possessing both capacity and inductance in shunt to one of said coils, a movable responsive device within the influence of current in said coils, and means for indicating angular displacement of said device.

9. The combination of two angularly-displaced coils, one of which is shunted by a capacity and an inductance in series, an induced member, and means for restraining the rotation of said induced member.

10. The combination of a plurality of angularly - displaced coils, one of which is shunted by a capacity and an inductance arranged in series, an induced member, and means for exerting a restraining moment upon said induced member.

In witness whereof I have hereunto set my hand this 6th day of December, 1899.

CHARLES P. STEINMETZ.

Witnesses:
BENJAMIN B. HULL,
JOSEPH GROSS.